(12) United States Patent
Wu

(10) Patent No.: US 9,070,957 B2
(45) Date of Patent: Jun. 30, 2015

(54) POWER SUPPLY DEVICE FOR LINEAR ACTUATOR APPARATUS AND BATTERY MODULE THEREOF

(75) Inventor: Chou-Hsin Wu, New Taipei (TW)

(73) Assignee: TIMOTION TECHNOLOGY CO., LTD., New Taipei (TW)

(*) Notice: Subject to any disclaimer, the term of this patent is extended or adjusted under 35 U.S.C. 154(b) by 574 days.

(21) Appl. No.: 13/481,516

(22) Filed: May 25, 2012

(65) Prior Publication Data

US 2013/0313907 A1 Nov. 28, 2013

(51) Int. Cl.
*H02J 7/00* (2006.01)
*H02J 9/00* (2006.01)
*H01M 10/48* (2006.01)
*H01M 10/42* (2006.01)

(52) U.S. Cl.
CPC .................. *H01M 10/48* (2013.01); *H02J 9/00* (2013.01); *Y10T 307/625* (2015.04); *H01M 10/4257* (2013.01)

(58) Field of Classification Search
CPC ...... H01M 10/48; H01M 10/4257; H02J 9/00
USPC .......................................................... 307/66
See application file for complete search history.

(56) References Cited

U.S. PATENT DOCUMENTS

| | | | |
|---|---|---|---|
| 2006/0097692 A1* | 5/2006 | Chen et al. ..................... 320/107 |
| 2008/0111425 A1* | 5/2008 | Chang .............................. 307/66 |
| 2008/0111427 A1* | 5/2008 | Elder et al. ....................... 307/66 |
| 2012/0038213 A1* | 2/2012 | Vogel et al. ..................... 307/64 |

* cited by examiner

*Primary Examiner* — Jared Fureman
*Assistant Examiner* — Esayas Yeshaw
(74) *Attorney, Agent, or Firm* — Chun-Ming Shih; HDLS IPR Services

(57) ABSTRACT

A power supply device for a linear actuator apparatus, which includes a control module and a battery module. The power supply device further provides a battery module including a box, a primary power supply unit and a standby power supply unit. The box has a first chamber, a second chamber and a separating plate formed between the first chamber and the second chamber. The primary power supply unit is provided in the first chamber. The standby power supply unit is provided in the second chamber.

13 Claims, 7 Drawing Sheets

POWER SUPPLY DEVICE FOR LINEAR ACTUATOR APPARATUS AND BATTERY MODULE THEREOF

BACKGROUND OF THE INVENTION

1. Field of the Invention

The present invention relates to a power supply device and a battery module thereof. In particular, the present invention relates to a power supply device and a battery module thereof, in which a standby power supply unit and a primary power supply unit are separated from each other.

2. Description of Prior Art

Electric cylinder is a mechanical linear actuator, which is widely used in controlling the elevation and inclination of a sickbed. More specifically, a plurality of linear actuators is mounted to a sickbed. All the linear actuators are electrically connected to a control box. The control box sends control signals to each linear actuator to control the action of the linear actuator. A common control box for the linear actuator comprises a control circuit board and a standby power control circuit board. Thus, even a user does not want to buy a standby battery, the user cannot but buy the standby power control circuit board. The fact that the standby power control circuit board is provided in the control box not only increases the production cost for the manufacturers of the control box, but also raises the expense of buying such a control box for those who need not to use a battery.

In order to solve this problem, the power control circuit board is externally attached to the battery instead of being provided in the battery. However, a hydrogen-acid battery used in the control box may generate hydrogen and oxygen when it is charged. If the thus-generated gas contacts the power control circuit board, a short circuit will be generated on the power control circuit board to thereby catch fire.

SUMMARY OF THE INVENTION

The present invention is to provide a power supply device, in which a standby power supply unit and a primary power supply unit are separated from each other. By this arrangement, the gas generated during the charging of the standby power supply unit will not contact the primary power supply unit to catch fire.

The present invention provides a power supply device for a linear actuator apparatus, which includes a control module and a battery module. The control module comprises a base and a control circuit board mounted in the base. The battery module is detachably connected to the base and electrically connected to the control circuit board. The battery module includes a box, a primary power supply unit and a standby power supply unit. The box has a first chamber, a second chamber and a separating plate formed between the first chamber and the second chamber. The first chamber has a first opening, and the second chamber has a second opening. The first opening and the second opening are located on two sides of the box. The primary power supply unit is provided in the first chamber. The standby power supply unit comprises at least one rechargeable battery disposed in the second chamber.

Preferably, in the power supply device, the first opening and the second opening are provided on two opposite sides of the box.

Preferably, the power supply device further comprises a first cover covering the first opening to seal the first chamber.

Preferably, the power supply device further comprises a second cover covering the second opening to seal the second chamber.

Preferably, the power supply device further comprises a through-hole provided on the separating plate. The primary power supply unit passes through the through-hole to be electrically connected to the standby power supply unit. The through-hole is processed to be airtight.

Preferably, the power supply device further comprises a switch provided on an outer surface of the box. The switch penetrates into the box to be electrically connected to the primary power supply unit.

Preferably, the power supply device further comprises an electric cable. One end of the electric cable is connected to the first chamber and electrically connected to the primary power supply unit. The other end of the electric cable is connected to the control module and electrically connected to the control circuit board.

Further, the present invention is to provide a battery module in which a standby power supply unit and a primary power supply unit are separated from each other. By this arrangement, the gas generated during the charging of the standby power supply unit will not contact the primary power supply unit to catch fire.

The present invention provides a battery module of a power supply device, which includes a box, a primary power supply unit and a standby power supply unit. The box has a first chamber, a second chamber and a separating plate formed between the first chamber and the second chamber. The first chamber has a first opening, and the second chamber has a second opening. The first opening and the second opening are located on two sides of the box. The primary power supply unit is provided in the first chamber. The standby power supply unit comprises at least one rechargeable battery disposed in the second chamber.

Preferably, in the battery module, the first opening and the second opening are provided on two opposite sides of the box.

Preferably, the battery module further comprises a first cover covering the first opening to seal the first chamber.

Preferably, the battery module further comprises a second cover covering the second opening to seal the second chamber.

Preferably, the battery module further comprises an electric cable connected to the first chamber and electrically connected to the primary power supply unit.

Preferably, the battery module further comprises a through-hole provided on the separating plate. The primary power supply unit passes through the through-hole to be electrically connected to the standby power supply unit. The through-hole is processed to be airtight.

Preferably, the battery module further comprises a switch provided on an outer surface of the box. The switch penetrates into the box to be electrically connected to the primary power supply unit.

In the power supply device and the battery module of the present invention, the standby power supply unit and the primary power supply unit are disposed in the second chamber and the first chamber respectively, so that they are separated from each other. Thus, the gas generated during the charging of the standby power supply unit will not contact the primary power supply unit to catch fire. In comparison with prior art, the present invention has a reduced cost and price. Further, the present invention has an improved safety in use.

DETAILED DESCRIPTION OF THE INVENTION

Figure 1:
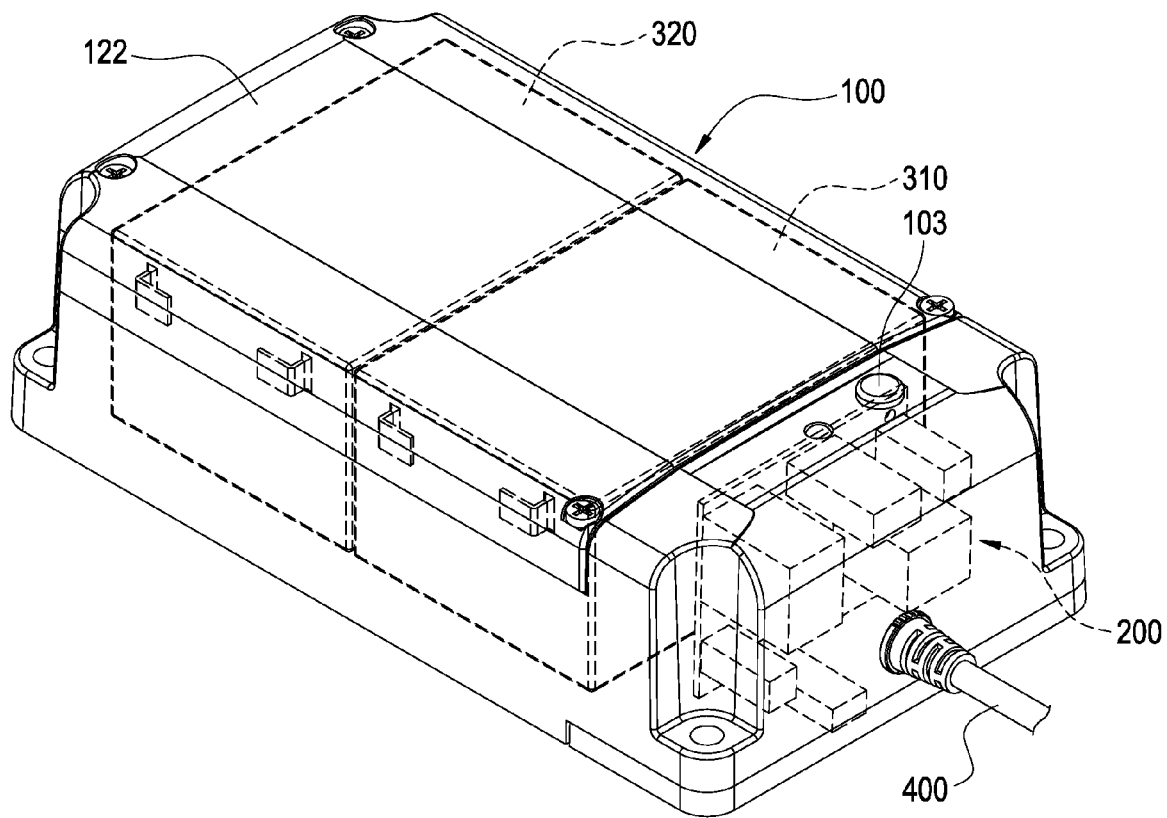
FIG. 1 is a schematic view showing the external appearance of the battery module according to a first embodiment of the present invention.

Please refer to FIG. 1. The first embodiment of the present invention provides a battery module, which is used in a power supply device. The power supply device preferably comprises a control module. The battery module of the present invention comprises a box 100, a primary power supply unit 200, a standby power supply unit and an electric cable 400.

Figure 2:
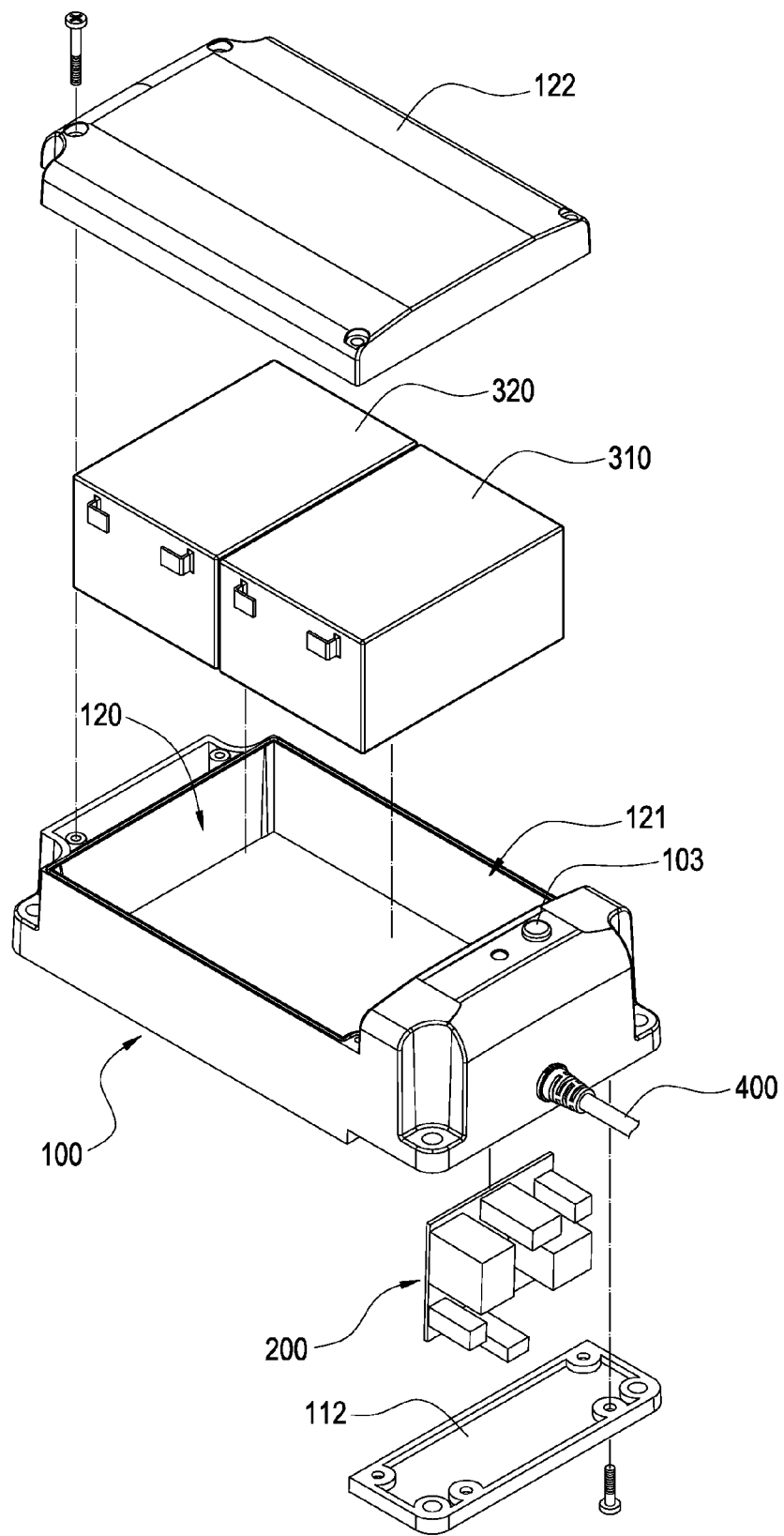
FIG. 2 is an exploded view (I) of the battery module according to the first embodiment of the present invention.
Figure 3:
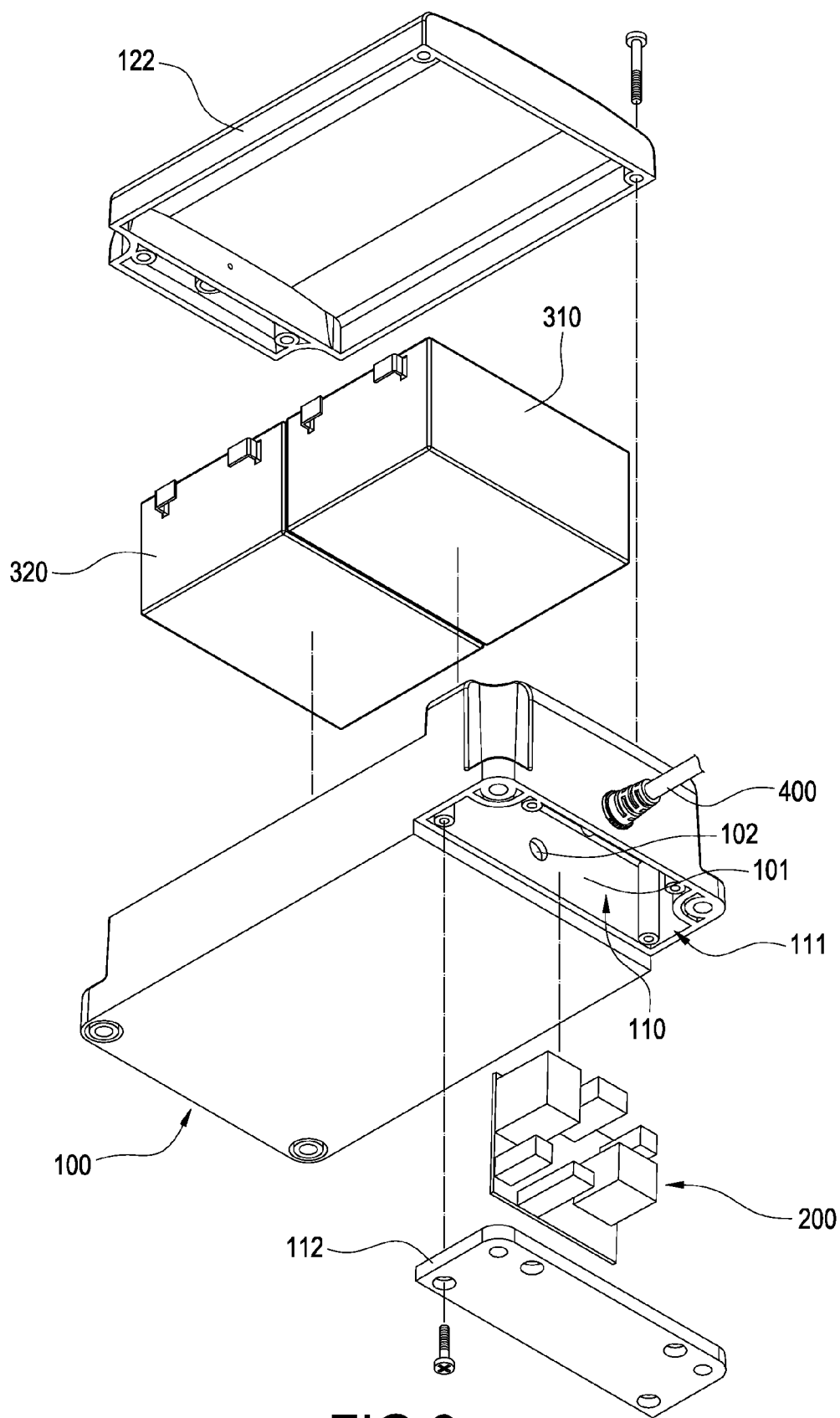
FIG. 3 is an exploded view (II) of the battery module according to the first embodiment of the present invention.

Please refer to FIGS. 2 and 3. The box 100 comprises a first chamber 110 and a second chamber 120. The first chamber 110 and the second chamber 120 are located in the box 100. A separation plate 101 is formed between the first chamber 110 and the second chamber 120, thereby separating the first chamber 110 and the second chamber 120 from each other. The first chamber 110 has a first opening 111 provided on the box 100. The second chamber 120 has a second opening 121 provided on the box 100. The first opening 111 and the second opening 121 are located on two different sides of the box 100. In the present embodiment, preferably, the first opening 111 and the second opening 121 are provided on two opposite sides of the box 100.

The primary power supply unit 200 is provided in the first chamber 110. The primary power supply unit 200 passes through the first opening 111 to be disposed in the first chamber 110. The standby power supply unit comprises at least one rechargeable battery 310/320. In the present embodiment, the standby power supply unit preferably comprises two rechargeable batteries 310/320 disposed in the second chamber 120. The rechargeable battery 310/320 passes through the second opening 121 to be disposed in the second chamber 120. Since the second opening 121 and the first opening 111 are located on two opposite sides of the box 100 and separated from each other, the gas generated during the charging of the rechargeable battery 310/320 can be prevented from penetrating into the first chamber 110 to contact the primary power supply device 200. An outer wall of the first opening 111 is provided with a first cover 112, which is preferably fixed to the first opening 111 by screws for sealing the first chamber 110. An outer wall of the second opening 121 is provided with a second cover 122, which is preferably fixed to the second opening 121 by screws for sealing the second chamber 120. However, the first cover 112 and the second cover 122 of the present invention are not limited to be fixed by screws only.

Figure 4:
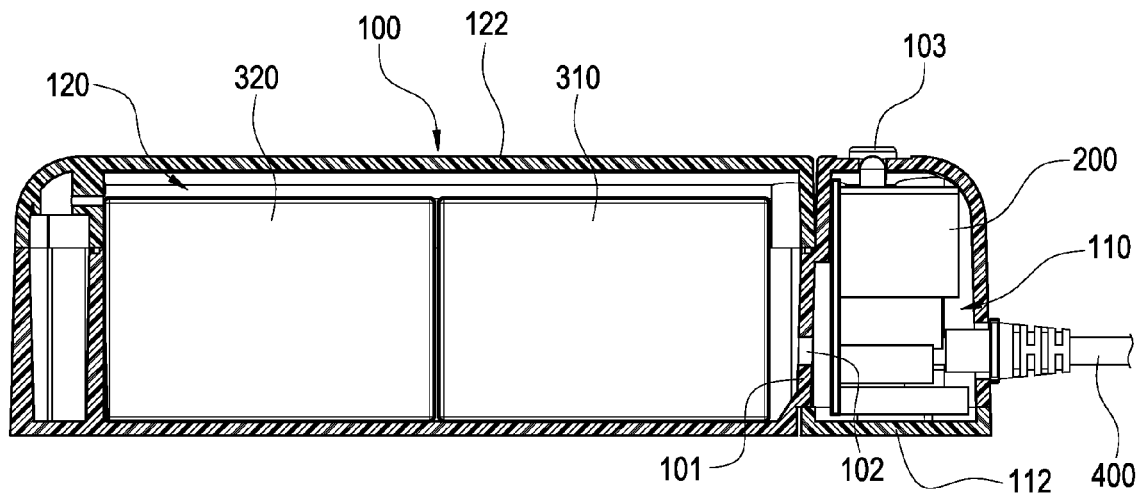
FIG. 4 is a cross-sectional view of the battery module according to the first embodiment of the present invention.

Please refer to FIG. 4. In the battery module of the present invention, a through-hole 102 is provided on the separating plate 101 between the first chamber 110 and the second chamber 120. Preferably, the primary power supply unit 200 is electrically connected to the rechargeable battery 310/320 via a set of electric wires passing through the through-hole 102. The through-hole 102 is processed to be air-tight, for example, the periphery of the through-hole 102 is coated with silicon. In this way, the first chamber 110 and the second chamber 120 can be well separated from each other. In the battery module of the present invention, the primary power supply unit 200 is configured to control the charging of the rechargeable battery 310/320 of the standby power supply unit.

One end of the electric cable 400 is fixedly connected to the first chamber 110 and electrically connected to the primary power supply unit 200. The other end of the electric cable 400 is connected to the control module 500. Preferably, an outer surface of the box 100 is provided with a switch 103. The switch 103 passes through the box 100 to be electrically connected to the primary power supply unit 200, whereby a user can turn on/off the switch 103 to control the battery module to provide or shut off the power to the control module 500.

Figure 5:
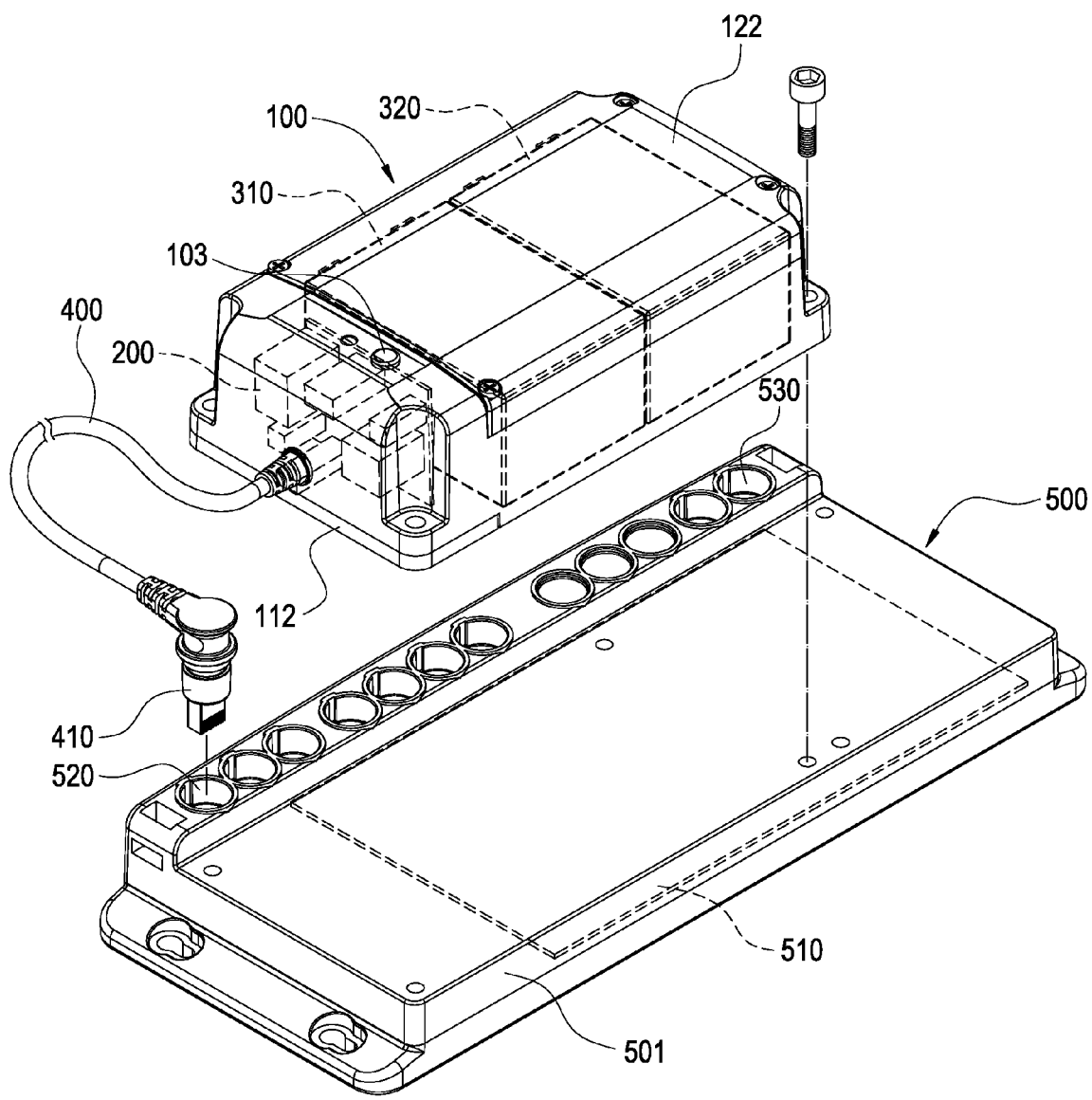
FIG. 5 is a schematic view (II) of the power supply device according to a second embodiment of the present invention.
Figure 6:
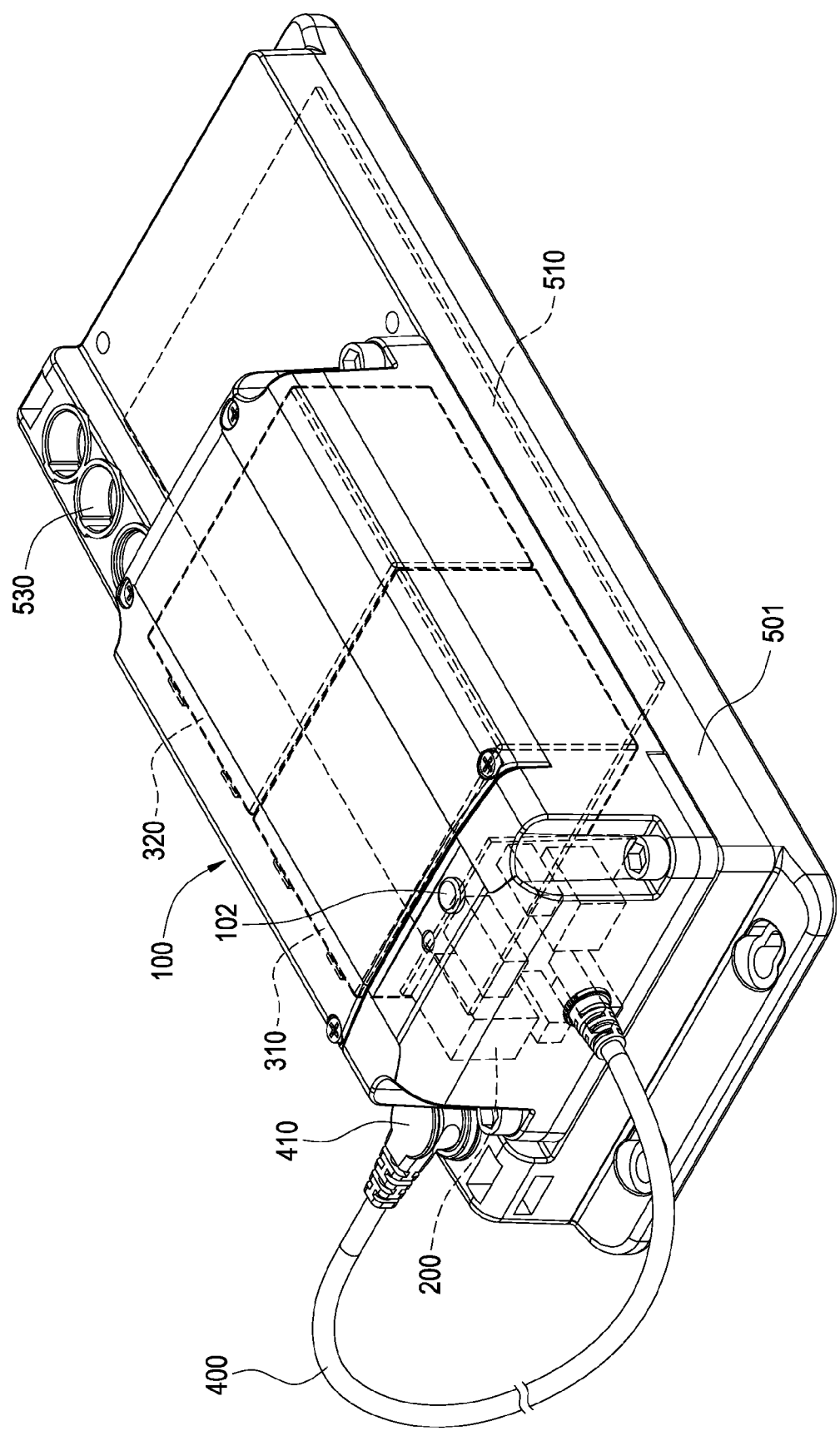
FIG. 6 is a schematic view (I) of the power supply device according to a second embodiment of the present invention.

Please refer to FIGS. 5 and 6. The second embodiment of the present invention provides a power supply device, which comprises a control module 500 and a battery module.

The control module 500 comprises a base 501, a control circuit board 510 provided in the base 501, at least one power port 520, and a plurality of control ports 530. The power port 520 and the control ports 530 are exposed to the base 501 and electrically connected to the control circuit board 510. The battery module is detachably connected to the base 501 and electrically connected to the control circuit board 510. The structure of the battery module in the second embodiment is substantially the same as that in the first embodiment. The battery module is preferably fixed to the base 501 of the control module 500 by screws. However, the present invention is not limited to this, and the battery module may be separated from the control module 500. One end of the electric cable 400 of the battery module is fixedly connected to the first chamber 110 and electrically connected to the primary power supply unit 200. The other end of the electric cable 400 is a power connector 410. The power connector 410 is inserted into the power port 520 of the control module 500 to be electrically connected to the control circuit board 510, thereby supplying power to the control circuit board 510.

Figure 7:
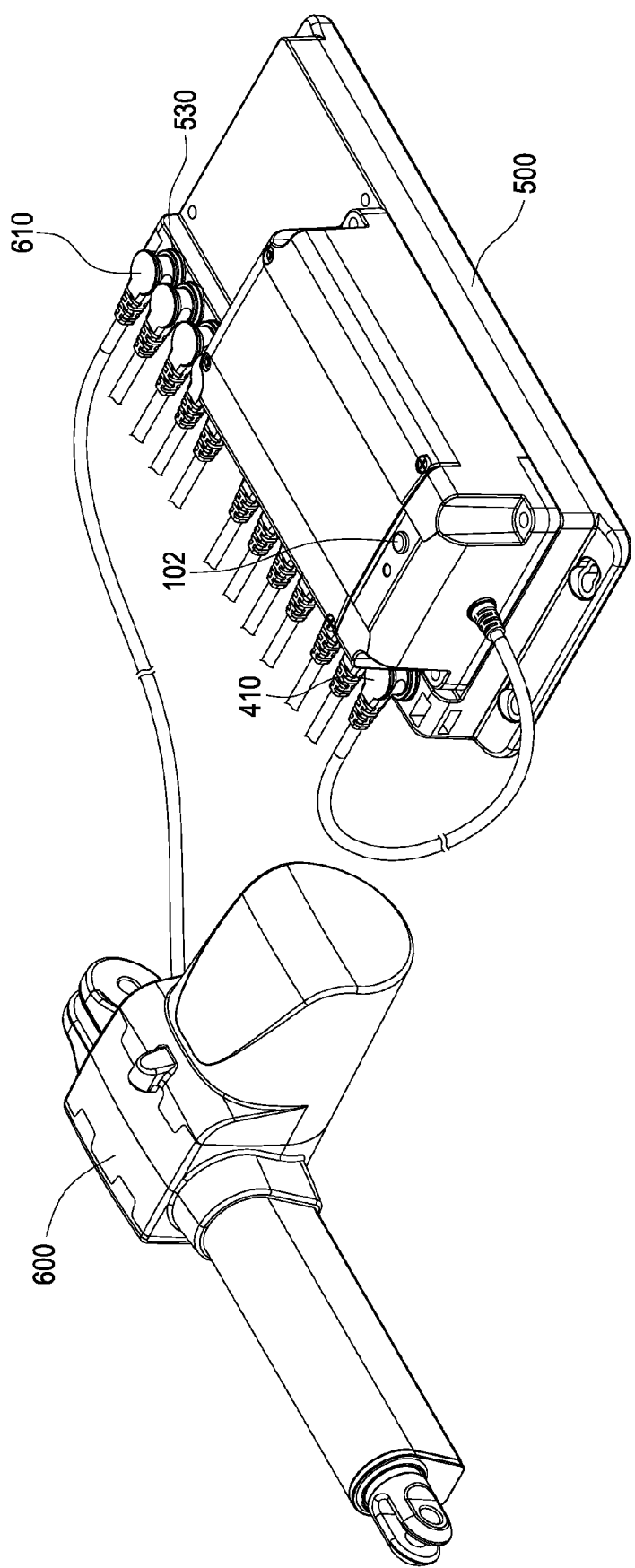
FIG. 7 is a schematic view (III) of the power supply device according to the second embodiment of the present invention.

Please refer to FIG. 7. The power supply device of the present invention is used to connect and control at least one linear actuator apparatus such as an electric cylinder 600. In the present embodiment, the power supply device of the present invention is preferably connected to a plurality of electric cylinders 600. Each electric cylinder 600 is inserted into a control port 530 via a control line 610 to thereby electrically connect the electric cylinder 600 and the control circuit board 510. One of the control port 530 is connected to a controller. The controller is configured to input signals to the control circuit board 510 and then outputs signals to the electric cylinder 600 to thereby control the action of the electric cylinder 600.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supply device for a linear actuator apparatus, including:
   a control module enclosed in a case and comprising a base and a control circuit board mounted in the base; and
   a battery module detachably connected to the base and electrically connected to the control circuit board, the battery module comprising:

a box having a first chamber, a second chamber and a separating plate formed between the first chamber and the second chamber, the first chamber having a first opening, the second chamber having a second opening, the first opening and the second opening being located on two sides of the box;

a primary power supply unit provided in the first chamber; and a standby power supply unit comprising at least one rechargeable battery disposed in the second chamber, wherein the base is connected to an outer surface of the box, and the base has a power port electrically connected the box and at least one control port for connecting to the linear actuator apparatus.

2. The power supply device for a linear actuator apparatus according to claim 1, wherein the first opening and the second opening are provided on two opposite sides of the box.

3. The power supply device for a linear actuator apparatus according to claim 1, further comprising a first cover covering the first opening to seal the first chamber.

4. The power supply device for a linear actuator apparatus according to claim 1, further comprising a second cover covering the second opening to seal the second chamber.

5. The power supply device for a linear actuator apparatus according to claim 1, further comprising a through-hole provided on the separating plate, the primary power supply unit passing through the through-hole to be electrically connected to the standby power supply unit, the through-hole being processed to be airtight.

6. The power supply device for a linear actuator apparatus according to claim 1, further comprising a switch provided on an outer surface of the box, the switch penetrating into the box to be electrically connected to the primary power supply unit.

7. The power supply device for a linear actuator apparatus according to claim 1, further comprising an electric cable, one end of the electric cable being connected to the first chamber and electrically connected to the primary power supply device, the other end of the electric cable being connected to the control module and electrically connected to the control circuit board.

8. A battery module of a power supply device, including:

a box having a first chamber, a second chamber and a separating plate formed between the first chamber and the second chamber, the first chamber having a first opening, the second chamber having a second opening, the first opening and the second opening being located on two sides of the box;

a primary power supply unit provided in the first chamber; and a standby power supply unit comprising at least one rechargeable battery disposed in the second chamber, wherein a through-hole is provided on the separating plate, the primary power supply unit passing through the through-hole to be electrically connected to the standby power supply unit, and the through-hole is processed to be airtight.

9. The battery module of a power supply device according to claim 8, wherein the first opening and the second opening are provided on two opposite sides of the box.

10. The battery module of a power supply device according to claim 8, further comprising a first cover covering the first opening to seal the first chamber.

11. The battery module of a power supply device according to claim 8, further comprising a second cover covering the second opening to seal the second chamber.

12. The battery module of a power supply device according to claim 8, further comprising an electric cable connected to the first chamber and electrically connected to the primary power supply unit.

13. The battery module of a power supply device according to claim 8, further comprising a switch provided on an outer surface of the box, the switch penetrating into the box to be electrically connected to the primary power supply unit.

* * * * *